United States Patent
Mohanty et al.

(10) Patent No.: US 10,746,692 B2
(45) Date of Patent: Aug. 18, 2020

(54) DEBYE LENGTH MODULATION

(71) Applicant: FemtoDx, Beverly Hills, CA (US)

(72) Inventors: Pritiraj Mohanty, Los Angeles, CA (US); Shyamsunder Erramilli, Quincy, MA (US)

(73) Assignee: FemtoDx, Beverly Hills, CA (US)

( * ) Notice: Subject to any disclaimer, the term of this patent is extended or adjusted under 35 U.S.C. 154(b) by 0 days.

(21) Appl. No.: 15/532,756

(22) PCT Filed: Jul. 22, 2015

(86) PCT No.: PCT/US2015/041527
§ 371 (c)(1),
(2) Date: Jun. 2, 2017

(87) PCT Pub. No.: WO2016/089453
PCT Pub. Date: Jun. 9, 2016

(65) Prior Publication Data
US 2019/0094174 A1    Mar. 28, 2019

Related U.S. Application Data

(63) Continuation-in-part of application No. 14/558,862, filed on Dec. 3, 2014.

(60) Provisional application No. 61/911,376, filed on Dec. 3, 2013, provisional application No. 61/911,385, filed on Dec. 3, 2013.

(51) Int. Cl.
*G01N 27/414*  (2006.01)
*G01N 22/00*   (2006.01)
*G01N 27/327*  (2006.01)

(52) U.S. Cl.
CPC ........ *G01N 27/4145* (2013.01); *G01N 22/00* (2013.01); *G01N 27/3278* (2013.01)

(58) Field of Classification Search
CPC .......................................... G01N 27/327–3278
See application file for complete search history.

(56) References Cited

U.S. PATENT DOCUMENTS

2014/0106338 A1* 4/2014 Fischer ............ G01N 27/44791
                                                                435/5
2017/0176379 A1* 6/2017 Bashir ................ G01N 33/5438

OTHER PUBLICATIONS

Girish Kulkarni, Zhaohui Zhong, Detection Beyond the Debye Screening Length in a High-Frequency Nanoelectronic Biosensor, Nano Letters, 2012, 719-723 (Year: 2012).*

* cited by examiner

*Primary Examiner* — Bach T Dinh
(74) *Attorney, Agent, or Firm* — Wolf, Greenfield & Sacks, P.C.

(57) ABSTRACT

Systems and methods for detection of biological agents are generally described. Target biological agents may be detected by use of a sensor, which in some situations is a nanowire. An external electric field is applied in some embodiments to induce an electric dipole. The induced electric dipole is detected, allowing detection of the biological agent.

17 Claims, 9 Drawing Sheets

DEBYE LENGTH MODULATION

RELATED APPLICATIONS

This application is a U.S. National Stage patent application based on International Application PCT/US2015/041527, filed Jul. 22, 2016, which is a continuation-in-part of U.S. patent application Ser. No. 14/558,862, filed Dec. 3, 2014, and entitled "Debye Length Modulation," which claims priority under 35 U.S.C. § 119(e) to U.S. Provisional Patent Application Ser. No. 61/911,376, filed Dec. 3, 2013, and entitled "Debye Length Modulation," and to U.S. Provisional Patent Application Ser. No. 61/911,385, filed Dec. 3, 2013, and entitled "Sensing Methods Involving Debye Length Modulation," each of which are incorporated herein by reference in its entirety for all purposes.

TECHNICAL FIELD

Systems and methods for detection of biological agents are generally described.

BACKGROUND

Biosensors generally comprise devices integrated with a biological sensing element (often a product derived from a living system) and a signal transducer, which can provide a recognition signal of the presence of a specific substance. The biological sensing element (which can include, for example, an enzyme, an antibody, a nucleic acid, and/or another analyte-detecting molecule) generally determines the specificity of the biosensor. The specific binding or reaction between the target and the receptor (or the biological sensing element) can introduce a signal that is then transduced and measured. Biosensors can be configured for macromolecular recognition, such as with human cells of different types, viruses, and pathogenic organisms. Therefore, there is a far-reaching diagnostic utility in these devices ranging from applications towards human health, food safety, drug response, and personalized medicine.

Biosensors may be categorized by their operational mechanism. Although optical biosensors using colorimetric, fluorescence, luminescence, and absorbance are industry and diagnostics standards, these strategies often necessitate target labeling and amplification. Also, the instrumentation footprint necessary to sensitively read optically-based signals is large compared with that achievable with devices incorporating nanotechnologies and microelectronics. Thus, technologies that improve the sensitivity, cost, instrumentation, and/or field applicability of biosensors are desirable.

SUMMARY

Systems and methods for the detection of biological agents are provided. Certain embodiments involve applying an alternating electric field to a nanosensor functionalized with a chemical and/or biological detector species such that the Debye length of an analyte associated with the chemical and/or biological detector species is altered. Certain embodiments relate to inventive methods by which data may be collected for sample analysis.

The subject matter of the present invention involves, in some cases, interrelated products, alternative solutions to a particular problem, and/or a plurality of different uses of one or more systems and/or articles.

One aspect relates to a device for sensing a chemical and/or biological analyte. The device comprises, according to certain embodiments, a nanosensor, wherein at least a portion of the nanosensor is functionalized with a chemical and/or biological detector species; and a source of an alternating electric field, wherein the source is configured such that the electric field produced by the source is incident upon the nanosensor.

In some embodiments, the alternating electric field has an incident power of at least about 1 picowatt at the nanosensor. According to certain embodiments, the nanosensor is a semiconductor nanosensor. In some embodiments, the semiconductor comprises silicon. The source comprises, according to some embodiments, an electrode, a microwave cavity, and/or a radiating antenna. In some embodiments, the nanosensor and the electrode are positioned on a common substrate. According to certain embodiments, the nanosensor and the electrode are positioned on different substrates. The frequency of the alternating electric field is, according to certain embodiments, at least about 1 kHz, at least about 1 MHz, at least about 1 GHz, or between about 1 kHz and about 1 THz.

In certain embodiments, the source is configured to alter the Debye length of the analyte. In some embodiments, the frequency of the alternating electric field produced by the source is selected, at least in part, based upon the ionic concentration of the solution. The nanosensor is configured, according to certain embodiments, to produce a signal indicative of an association between the analyte and the detector species. In some embodiments, the device comprises a source of a second alternating electric field, wherein the source is configured such that the second alternating electric field produced by the source is incident upon the nanosensor. In some embodiments, the second alternating electric field has a frequency that is different from the frequency of the first alternating electric field by at least about 10% of the frequency of the first alternating electric field. According to certain embodiments, the second alternating electric field has an incident power, at the nanosensor that is different from the incident power, at the nanosensor, of the first alternating electric field by at least about 50% of the incident power of the first current electric field, at the nanosensor. In some embodiments, the detector species is an antibody, enzyme, protein, peptide, small molecule, nucleic acid, aptamer, receptor molecule, polymer, and/or supramolecular structure. According to certain embodiments, the analyte is a protein, a small molecule, a nucleic acid, a peptide, an antibody, an aptamer, a biomarker, a gene, a supramolecular structure, a macromolecule, a receptor molecule, a biological cell, and/or a biological cell cluster.

Certain embodiments relate to a method of sensing a chemical and/or biological analyte. According to certain embodiments, the method comprises applying an alternating electric field to a nano sensor functionalized with a chemical and/or biological detector species such that the Debye length of an analyte associated with the chemical and/or biological detector species is altered.

In some such embodiments, the Debye length of the analyte is increased. In some such embodiments, the Debye length of the analyte is decreased. In certain such embodiments, a bias is applied across the Debye layer to further modify the Debye length. In some such embodiments, the bias is configured to change the capacitance of the Debye layer.

In some embodiments, the method of sensing a chemical and/or biological analyte comprises applying an alternating electric field to a nanosensor functionalized with a chemical and/or biological detector species in the presence of a sample comprising an analyte; applying an electrical potential across the nanosensor; collecting a first set of data, based on the applied electrical potential, at points in time at which the alternating electric field is at a first power to provide a background signal; and collecting a second set of data, based on the applied electrical potential, at points in time at which the alternating electric field is at a second power that is different from the first power to provide a signal indicative of a property of the analyte, the detector species, and/or an interaction between the analyte and the detector species.

In some such embodiments, the points in time at which the second set of data points are collected are phase-shifted from the points in time at which the first set of data points are collected. According to certain such embodiments, the points in time at which the second set of data points are collected are phase-shifted from the points in time at which the first set of data points are collected by from about 75° to about 105°, by from about 85° to about 95°, or by from about 88° to about 92°. In some such embodiments, collecting the first set of data at points in time at which the alternating electric field is at the first power to provide the background signal comprises collecting the first set of data at points in time at which the alternating electric field has a power of less than about 10% of its maximum power. In certain such embodiments, collecting the first set of data at points in time at which the alternating electric field is at the first power to provide the background signal comprises collecting the first set of data at points in time at which the alternating electric field has a power of zero. In some such embodiments, collecting the second set of data at points in time at which the alternating electric field is at the second power comprises collecting the second set of data at points in time at which the alternating electric field has a power that is within about 10% of its maximum power.

In some embodiments, the method of sensing a chemical and/or biological analyte comprises applying an electrical potential across a nanosensor functionalized with a chemical and/or biological detector species in the presence of a sample comprising an analyte; and simultaneously collecting a first set of data to provide a background signal and a second set of data to provide a signal indicative of a property of the analyte, the detector species, and/or an interaction between the analyte and the detector species.

Some embodiments can comprise applying, to the nanosensor an alternating electric field having an incident power of at least about 1 picowatt at the nanosensor.

In some embodiments, the nanosensor is a semiconductor nanosensor. In certain embodiments, the semiconductor comprises silicon.

Certain embodiments comprise applying an alternating electric field having a frequency of at least about 1 kHz, at least about 1 MHz, at least about 1 GHz, or between about 1 kHz and about 1 THz to the nanosensor.

Some embodiments comprise selecting the frequency of the alternating electric field based, at least in part, upon the an ionic concentration of the solution.

Certain embodiments comprise applying a second alternating electric field to the nanosensor. In some embodiments, the second alternating electric field has a frequency that is different from the frequency of the first alternating electric field by at least about 10% of the frequency of the first alternating electric field. In some embodiments, the second alternating electric field has an incident power, at the nanosensor, that is different from the incident power, at the nanosensor, of the first alternating electric field by at least about 50% of the incident power, at the nanosensor, of the first alternating electric field.

In some embodiments, the detector species is an antibody, an enzyme, protein, peptide, small molecule, nucleic acid, aptamer, receptor molecule, polymer, and/or supramolecular structure. In certain embodiments, the analyte is a protein, enzyme, protein, peptide, small molecule, nucleic acid, aptamer, receptor molecule, polymer, and/or supramolecular structure.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Systems and methods for detection of biological agents are generally described.

Certain embodiments are related to the field of sensors used to sense chemical or biological species (also referred to as analytes), for example in a sample solution. Some embodiments are related to methods for improving performance of sensors embedded in a solution by modulating the Debye screening length. When an analyte is embedded in a solution, its electrical charge can be shielded, in some cases, by ions in the aqueous solution. The corresponding length scale for this charge shielding is generally referred to as the Debye screening length. Since the goal in many sensing applications is to measure one or more properties influenced by the charge on an analyte, controlling the effect of charge shielding can be useful in achieving accurate and sensitive detection of the analyte. For instance, the goal in a sensing applications may be to measure a change in current in an underlying nanochannel due to the presence of a charge near its surface, which acts as a gate voltage. Certain embodiments are related to methods to modulate, control, and/or manipulate the Debye screening length so that sensors are not adversely affected by the effect of Debye screening.

Generally, the Debye layer is formed by the accumulation of ions on any charged surface or charged entity (e.g., embedded in an aqueous solution). When a charged object is placed in an electrolytic solution, ions in the solutions can position themselves in an electric double layer which screens the charged object. In certain instances, the potential due to the charges on the protein then falls off exponentially, with a characteristic Debye length $\lambda_d$, calculated as:

$$\lambda_d = \sqrt{\frac{\epsilon k_B T}{\Sigma_j c_j^\infty q_j^2}}$$

where $k_B$ is the Boltzmann constant, T is the temperature of the solution, ε is the dielectric permittivity of the solution, $\Sigma_j$ is the sum over the species of ions, q is the charge of the ion, and $c^\infty$ is the bulk concentration of the ion. Those of ordinary skill in the art would be capable of calculating the Debye length of a particular solution at a particular location by measuring the temperature of the solution and the concentration of the ions in the solution at the particular location.

Figure 1:
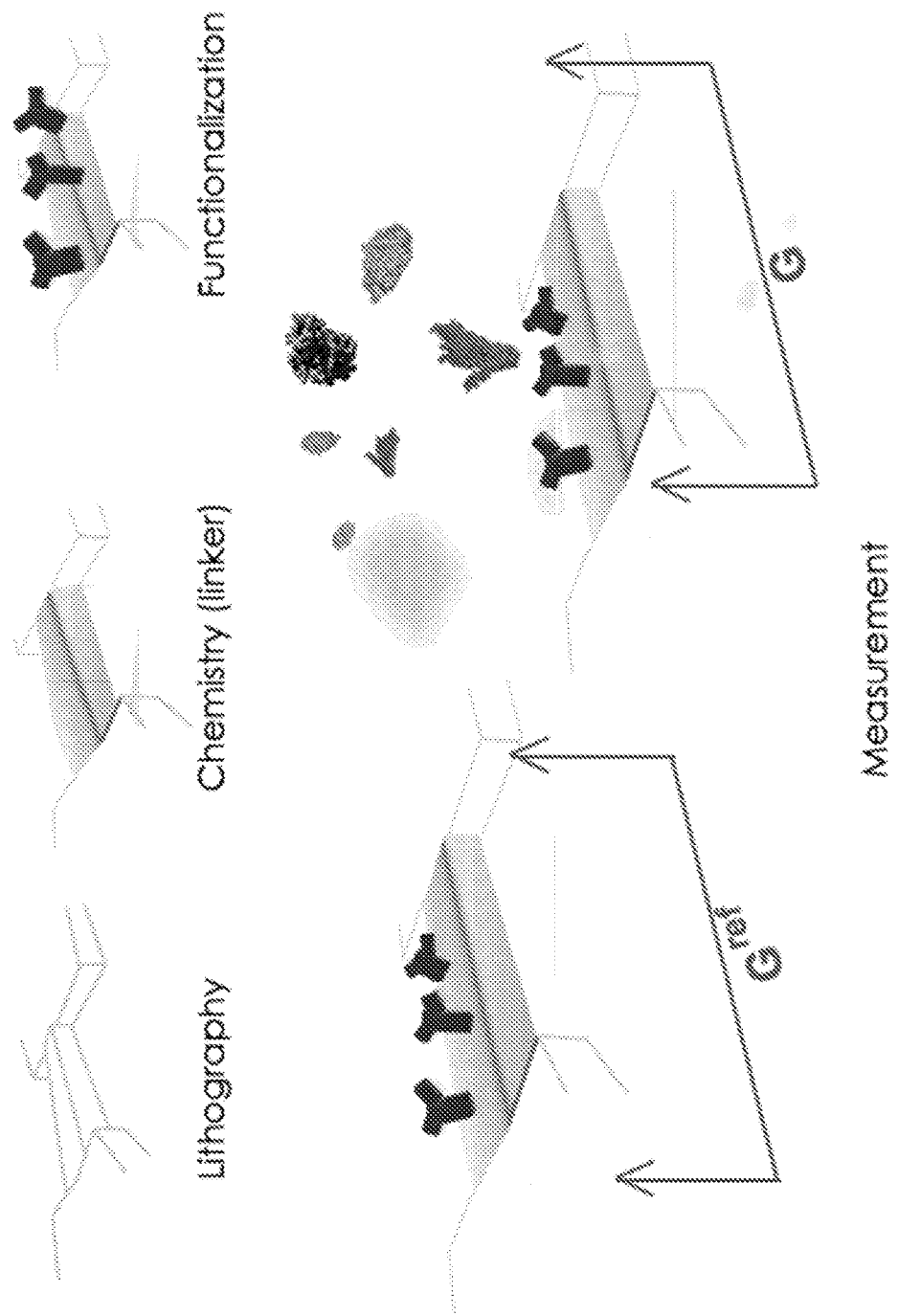
FIG. 1 is a diagram showing the stepwise manufacturing of FET devices for diagnostics tests. Nanosensors of precise dimensionality and surface area can be formed that are highly sensitive to surface charge changes. Following a process of lithography and chemistry, antibodies can be conjugated to the surface of the sensor (shaded area). Analyte measurements can be conducted with samples containing heterogeneous mixtures of disease-relevant proteins, such as in blood, saliva, and other fluids. Specific analyte binding contributes to a surface charge differential, which can be detected electrically as a change in conductance (delta G, $\Delta G$) across the nanosensor surface. In the figure, unshaded areas are a source and a drain for every nanosensor.
Figure 2:
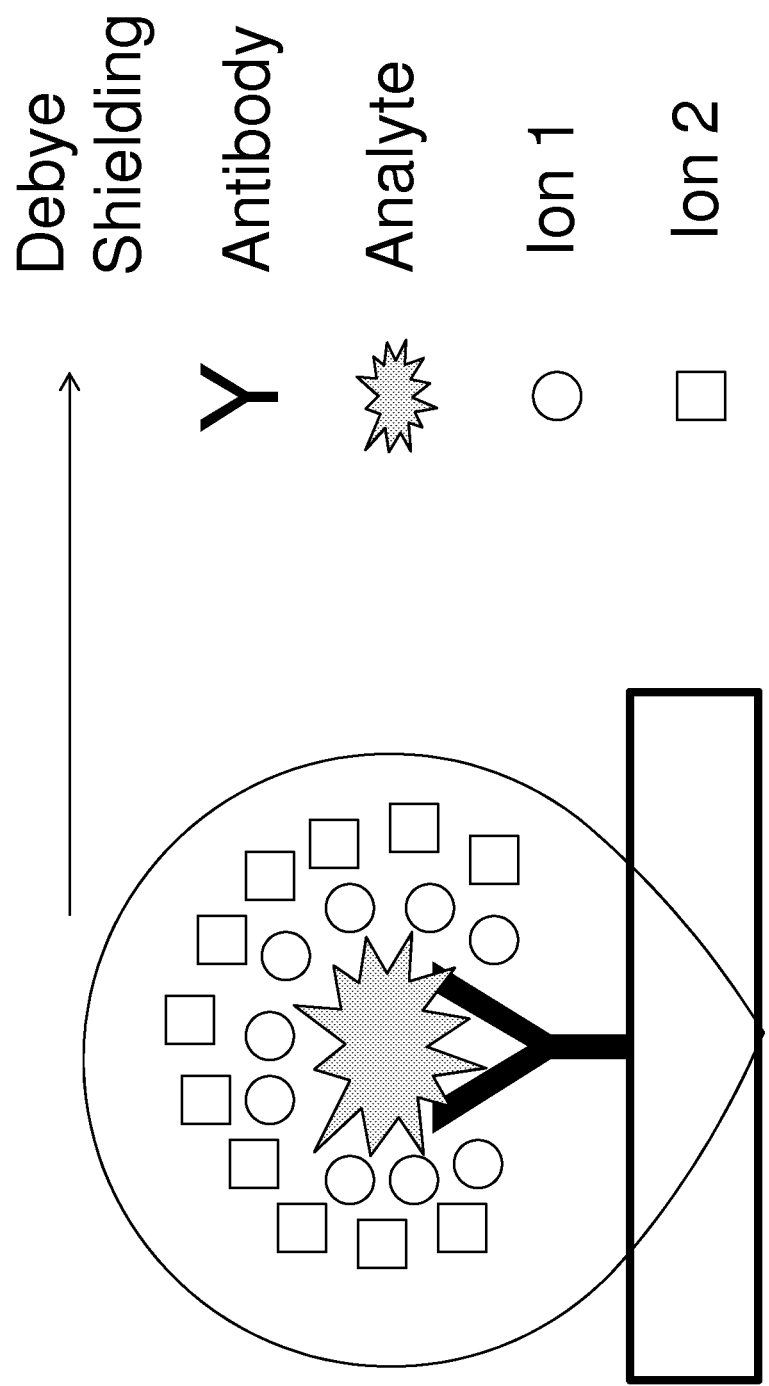
FIG. 2 is a diagram showing the formation of an electric double layer which creates Debye shielding. The analyte on the antibody is usually charged. Ions with opposite charge (to that of the analyte) arrange around the analyte. Other ions with opposite charge to that of the first ion (and hence similar to that of the analyte) arrange around the first ion. This electric double layer creates the Debye shielding, effectively allowing the sensor to see only up to a characteristic length in the solution, characterized as the Debye length.

The Debye length can thus be thought of as a measure of how far the sensor can "see" into the solution (see, e.g., FIG. 1). At biologically relevant salt concentrations, the Debye length may be shorter (e.g., about 1 nm) than the distance between the sensor surface and the protein of interest (e.g., about 10 nm), in which case the electrostatic screening of the analyte prohibits its sensing. Reducing the ionic concentration can be effective at increasing the Debye length. For example, in a biological sample such as blood the salt concentration can be reduced. However, reducing the ionic concentration can be detrimental to the bioactivity of the analytes such as disease-specific proteins. Furthermore, the desalinization of the sample solution (such as blood or any other bodily fluid) is a relatively time-consuming process. This extra time required for desalinization is particularly detrimental to detection of analytes such as disease-specific proteins in point-of-care applications, which often require faster detection time and fewer sample preparation steps. Indiscriminant reduction of Debye screening is also often counterproductive, as some shielding may be needed to prevent undesired signals from charged molecules not bound to the sensor surface. A desirable alternative to reducing the ionic concentration of the sample is to electronically control the characteristic length over which sensor can see into the solution.

Accordingly, certain embodiments relate to controlling the characteristic length over which a nanosensor can "see" into an analyte-containing liquid. For example, in certain embodiments, a device for sensing a chemical and/or biological analyte, comprises a source of an alternating electric field, wherein the source is configured such that the electric field produced by the source is incident upon the nanosensor. In some embodiments, the source can be used to apply an alternating electric field to the nanosensor, for example, such that the Debye length of an analyte associated with the chemical and/or biological detector species on the nanosensor is altered.

Certain embodiments relate to methods for sensing chemical and/or biological analytes. In some such embodiments, data can be collected from the nanosensor while the alternating electric field is applied to the nanosensor. For example, the change in the nanosensor conductance may be measured while the alternating electric field is applied to the nanosensor. Change in conductance may be due to the contribution of surface states to the conductance, which in certain embodiments may be dominated by surface contributions. The presence of charged analyte on the surface of an active nanosensor can induce a large fractional change in the nanosensor conductance, allowing the charged analyte to be detected.

In one embodiment, a silicon nanowire can be used as an ultrasensitive detector by taking advantage of the field effect. A conventional silicon nanowire can be used as a sensor of hydrogen ion concentration or a pH sensor by modifying its surface with 3-aminopropyltriethoxysilane (APTES), which produces amino groups as well as silanol (Si—OH) groups on the nanowire surface. These groups can operate as receptors of hydrogen ions, which undergo protonation/deprotonation reactions. In the process, the surface charge on the silicon nanowire changes, which, in turn, changes the nanowire conductance. In an n-type silicon nanowire, with increasing pH, there is an increase in the negative charge on the surface, which acts like a negatively charged gate. This causes the channel of the charge carrier to deplete, and therefore the net conductance decreases. The accumulation of carriers by the reception of hydrogen ions can be viewed as a field effect as it modulates the n-type FET device.

In some embodiments, the sampling rate of measurement (e.g., of conductance) can be in a wide range of time scales, for example, 1 second to 1 nanosecond, corresponding to a sampling frequency range of 1 Hz-1 GHz. As the analyte move within the fluid before (and sometimes after) being bound, directly or indirectly, to the nanosensor surface, the surface charge state will change and/or fluctuate depending on the location of the analyte. Therefore, taking multiple measurements in a short time (e.g., 1 MHz) allows a large data set (e.g., 1 million data points per second) to be collected. In some embodiments, this data set can be analyzed by an on-chip processor to determine the concentration of analyte. In certain embodiments, data analysis can be done using standard software after data acquisition.

In some embodiments, a first subset of the data collected during application of the alternating electric field to the nanosensor (e.g., corresponding to points in time at which the nanosensor is "shielded" by the presence of ions close to the nanosensor) can be used to establish a baseline (or background signal), which can be indicative of noise present in the nanosensor system. In some such embodiments, a second subset of the data collected during application of the alternating electric field to the nanosensor (e.g., corresponding to points in time at which the nanosensor is not "shielded" by the presence of ions close to the nanosensor) can be used to determine a property of the target analyte. In this way, according to certain embodiments, a single data-carrying signal can be used to simultaneously produce both baseline signal data and detection signal data. According some embodiments, the method comprises applying an electrical potential across the nanosensor; collecting a first set of data, based on the applied electrical potential, at points in time at which the alternating electric field is at a first power to provide a background signal; and collecting a second set of data, based on the applied electrical potential, at points in time at which the alternating electric field is at a second power that is different from the first power to provide a signal indicative of a property of the analyte, the detector species, and/or an interaction between the analyte and the detector species.

In some embodiments, simultaneously collecting data about the background and the analyte can be used to eliminate a separate background data collection step, which can accordingly decrease assay time, assay cost, and/or the number of reagents needed to perform the assay. In certain embodiments, simultaneously collecting data about the background and the analyte can yield a more accurate and realistic background signal, compared to background measurements performed in the absence of the analyte and/or in the absence of a sample containing the analyte. In some such cases, the overall specificity and sensitivity of the assay may be improved and/or the limit of detection may be lowered.

In some embodiments, acquiring data on a time scale faster than the kinetics (e.g., reaction) of a process may allow a real-time picture of the process to be constructed. For instance, acquiring data on a time scale faster than the reaction kinetics of the interaction between an analyte and a chemical or biological species associated with the surface of the nanosensor may allow a real-time picture of the interaction process (e.g., association, conformation change, dissociation, bond cleavage, bond formation) to be constructed. In certain embodiments, diffusion kinetics with a typical time scale, e.g. of a millisecond may be constructed. In some instances, data can be acquired at a sufficient time scale to allow the reaction kinetics that governs the binding of two or more species (e.g., at least three, at least four, at least 5, at least 6, at least 8, at least 10, or more species), such as an antibody and antigen or any other ligand-receptor pair to be constructed. In some such cases, one or more conformational changes in the species (e.g., protein) can be resolved using the acquired data. In certain embodiments, kinetic parameters, such as (e.g., reaction kinetic parameters, association constant, dissociation constant, reaction rate, enzyme kinetics, diffusion constant), spatial and/or temporal change in individual molecules due to conformational change, and/or other transduction mechanisms (e.g., charge transfer from one part of the bound system to another, conversion from charge to photon) may be determine using the acquired data. In general, any suitable data acquisition time scales that are relevant to the determination of the desired parameter may be used. In some embodiments, more than one data acquisition time scale may be used for different phases of a process.

As described in more detail below, certain of the embodiments described herein are related to nanoscale sensors, such as sensors implemented using semiconductor devices, or similar small-scale electrical devices, as sensitive transducers to convert chemical activity of interest into corresponding electrical signals representative of the chemical activity. The methods described in this disclosure can be applied to nanoscale sensors such as silicon nanochannel field effect transistor biosensors, nanowire nanosensors, quantum dot nanosensors, and other sensors which are used to detect one or many chemical or biological species, where the chemical or biological species are present in a solution and the sensor is embedded in the same solution.

For many sensing applications, it is beneficial to employ sensors having high sensitivity to a species of interest. Sensors with high sensitivity can be used to detect very small amounts or concentrations of the species, which may be necessary or desirable in some applications, and/or such sensors can provide a high signal-to-noise ratio, and thus improve the quality of measurements that are taken using such sensors. However, one of the major challenges in nanoelectronic detection of biological or chemical species is achieving the desired high specificity. While nanosensors can be configured to offer profound sensitivity, accurate detection of the specificity of molecular binding events can be challenging. One of the main issues is that the analyte is generally present in a sample, such as an aqueous solution, which may contain other chemical and biological species that interfere with the detection of the analyte. As one specific example, a primary binding event of low abundance proteins may be masked by less specific interactions of many other proteins, or proteins of high abundance. Since the FET biosensor detects the presence or the variation in the surface charge profile on the sensor surface, close proximity of other charged particles can contribute to the overall electrical signal being measured by the sensor. These undesired contributions are mixed with the signal of interest, arising from the presence of the analyte of interest, on or near the sensor surface. One approach to minimize the undesired contribution is to allow the sensor to obtain a signal only from analytes and other species within a specific distance from the sensor surface. Therefore, a method to control this specific distance, which could be analogous to the Debye length in some embodiments, can be useful in minimizing undesired contributions to the signal.

Figure 4:
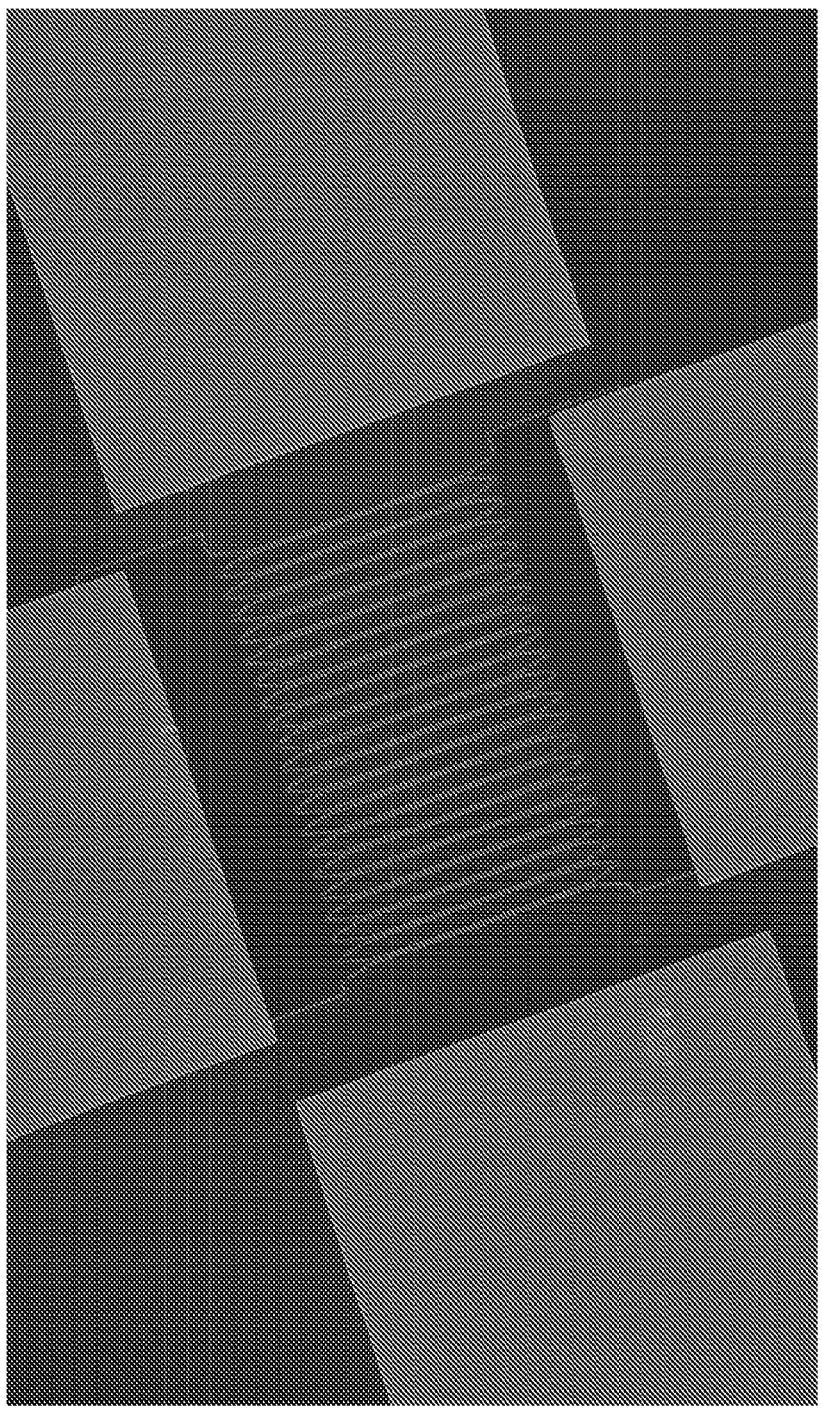
FIG. 4 is a scanning electron micrograph of a device with a set of nanowires. Electrodes 1 and 2 can serve as either a source or a drain. Electrodes 3 and 4 can be used to apply an alternating electric field (e.g., a microwave or an alternating current electric field) across the volume over the nanowire sensor surface.
Figure 5:
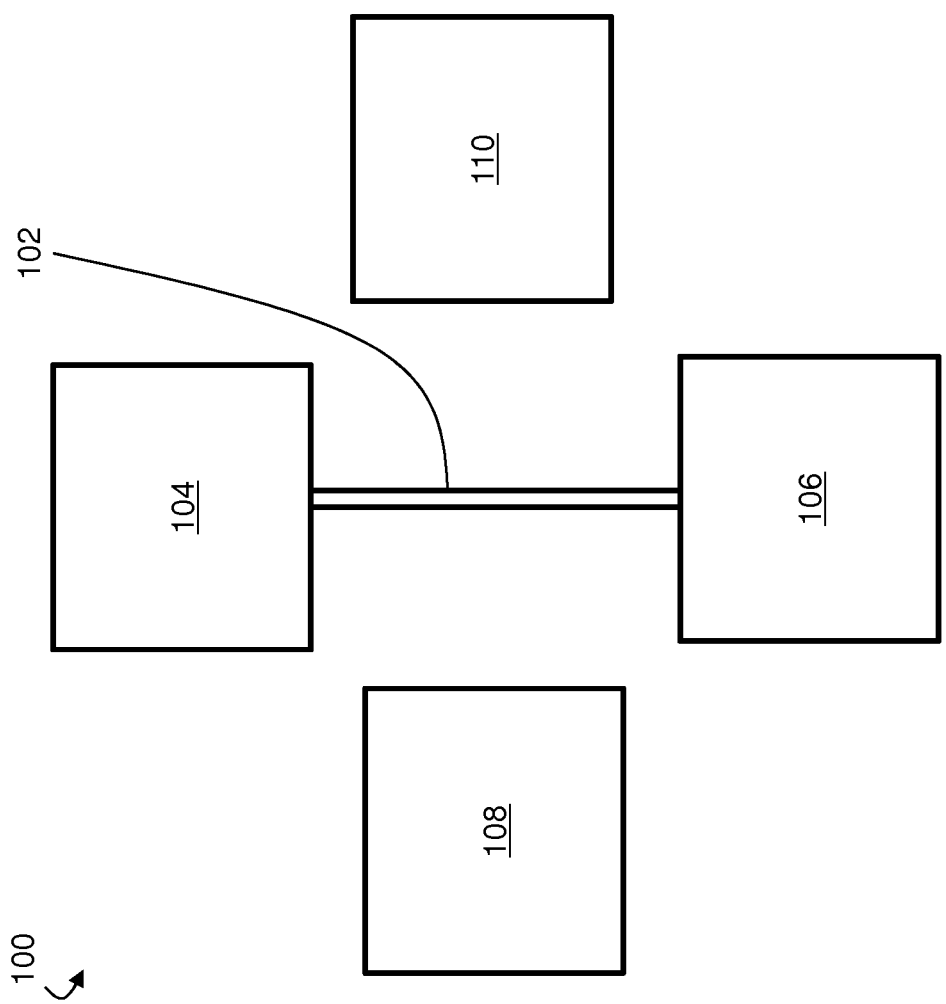
FIG. 5 is a schematic illustration of an exemplary device for sensing a chemical and/or biological analyte.

FIG. 5 is a schematic illustration of an exemplary device for sensing a chemical and/or biological analyte. In FIG. 5, device 100 comprises nanosensor 102. Nanosensor 102 can be in the form of, for example, a nanochannel. While a single nanochannel is illustrated in the set of embodiments shown in FIG. 5, it should be understood that, in other cases, multiple nanochannels can be used as the nanosensor. For example, FIG. 4 is a scanning electron micrograph of a device in which 20 nanochannels are employed.

In certain embodiments, the nanosensor is a semiconductor nanosensor. For example, in some embodiments, the nanosensor is a silicon nanosensor.

In certain embodiments, at least a portion of the nanosensor is functionalized with a chemical and/or biological detector species. The detector species may comprise, for example, an antibody, enzyme, protein, peptide, small molecule, nucleic acid, aptamer, receptor molecule, polymer, and/or a supramolecular structure. The analyte may comprise, for example, a protein, a small molecule, a nucleic acid, a peptide, an antibody, an aptamer, a biomarker, a gene, a supramolecular structure, a macromolecule, a receptor molecule, a biological cell, and/or a biological cell cluster. In some instances, the analyte may be a protein biomarker or a gene biomarker.

Devices for sensing a chemical and/or biological analyte can be operated by applying an electrical potential along the length of the nanosensor. For example, in FIG. 5, system 100 can be operated by applying a voltage across electrical contacts 104 and 106. This can result in a current being transported through nanosensor 102, which can be altered in response to an interaction between the target analyte and the detector species.

The device for sending a chemical and/or biological analyte comprises, according to certain embodiments, a source of an alternating electric field. In some embodiments, an alternating electric field (e.g., in the microwave range) is an electromagnetic wave defined by its frequency and power. The waveform of the alternating electric field may be sinusoidal or square waves, which may be selected in certain cases depending on the method of measurement. In some embodiments, the source of the electromagnetic wave may be designed in such a way as to align resultant electric field lines in a particular direction in reference to the location of the nanosensor surface. This may be done to optimize the interaction of the analyte or the ions in the solution with the electric field depending on the particular need. In some embodiments, the amplitude or power level of the electromagnetic wave may be selected to not to cause temperature increase or fluctuation that would affect accurate determination of analyte concentration and reaction kinetics parameters. Those of ordinary skill in the art would be aware of temperature increase or fluctuations that would affect the accuracy of the analysis. The source can be configured, according to some embodiments, such that the electric field produced by the source is incident upon the nanosensor. In some embodiments, the alternating electric field produced by the source is configured to alter the Debye length of the analyte.

Any suitable source capable of generating an alternating electric field can be used. In some embodiments, the source comprises an electrode. For example, referring to FIG. 5, system 100 includes electrodes 108 and 110. An alternating electric field can be applied to nanosensor 102, according to certain embodiments, by applying an alternating electric current across electrodes 108 and 110. Other types of sources of alternating electric fields can also be employed. In some embodiments, the source is capable of generating electromagnetic radiation. In some embodiments, the source comprises a microwave cavity. In some embodiments, the source comprises a radiating antenna. Combinations of these and/or other sources of alternating electric fields are also possible.

In some embodiments, the source of the alternating electric field and the nanosensor are positioned on a common substrate. In certain embodiments, the source of the alternating electric field and the nanosensor are positioned on different substrates. As one example, referring to FIG. 4, the nanosensor and the source electrodes are positioned on a common substrate. Of course, in other embodiments in which electrodes are used as sources of alternating electric fields, the electrodes and nanosensors can be positioned on different substrates.

In some embodiments, the alternating electric field has an incident power of at least about 1 picowatt, at least about 1 nanowatt, at least about 1 microwatt, or at least 1 milliwatt, 1 watt (and/or, in certain embodiments, up to 10 watts, or more) at the nanosensor.

As noted above, in some embodiments, the source is configured to alter the Debye length of the analyte. In certain embodiments, the frequency of the alternating electric field produced by the source is selected, at least in part, based upon the ionic concentration of the solution. Without being bound by theory, it is believed that an ionic solution containing many different species of ions can be described in terms of a macroscopic dielectric constant, which depends on the electrical polarization of each of the component ions, and both dielectric constant E and conductivity of the solution σ depend on frequency ω of the applied AC field. Frequency response of dielectric constant and conductivity is expressed in terms of dielectric dispersion, defined by $\varepsilon(\omega)$ and $\sigma(\omega)$, both of which contain real and imaginary components. The relaxation time of an electrolytic solution characterizes the time required for the screening of the charge and the electric field perturbations in the solution. The corresponding relaxation frequency $\omega_m$ is given by its inverse:

$$\omega_m = \frac{1}{\tau_m} = \frac{K_m}{\varepsilon_m}.$$

Here $K_m$ and $\varepsilon_m$ are conductivity and absolute dielectric constant of the ionic solution. Debye screening length $\lambda_D$ is related to these parameters, as $$\lambda_D = \sqrt{\frac{(D^+ + D^-)\varepsilon_m}{2K_m}}.$$

Here $D^+$ and $D^-$ are diffusion coefficients of positive (+) and negative (−) ions. The scale of $\tau_m$ corresponds to the time of diffusion of ions over a length scale of $\lambda_D$. The external AC field (or electromagnetic wave) incident on the ionic solution and the sensor may be defined as $$E(t) = E(\omega) \cdot e^{i\omega t}.$$

An advantage of a harmonic field is that any field induced response X(t) will also have the same time dependence in the linear response regime:

$$X(t) = X(\omega) \cdot e^{i\omega t}.$$

If the frequency of the external electric field ω is less than the relaxation frequency, $\omega \ll \omega_m$, then the conduction current density in the solution exceeds the displace current density. This implies that the space distribution of the local electric field is determined by the distribution of ionic currents. In the opposite extreme, $\omega \gg \omega_m$, displacement current density exceeds the conduction current density. Spatial distribution of electric fields depends on the local polarization of molecular dipoles.

In some embodiments, the frequency of the alternating electric field is at least about 1 kHz, at least about 1 MHz, or at least about 1 GHz (and/or, in certain embodiments, up to about 1 THz, or more). For example, in some embodiments, the frequency of the alternating electric field is from about 1 kHz to about 1 THz, from about 1 MHz to about 10 GHz, or from about 100 MHz to about 10 GHz.

In some embodiments, the nanosensor is configured to produce a signal indicative of an association between the analyte and the detector species. In general, the association between the analyte and the detector species can be of any suitable type. For example, the association can comprise a chemical interaction, a physical interaction, a biological interaction, and/or a close-proximity spatial orientation.

In some embodiments, the analyte and the detector species may associate via a chemical interaction, such as a chemical bond. The chemical bond may be a covalent bond or non-covalent bond. In some cases, the chemical bond is a non-covalent bond such as a hydrogen bond, ionic bond, dative bond, and/or a Van der Waals interaction. One or more of the species and/or agents may comprise functional groups capable of forming such bonds. It should be understood that covalent and non-covalent bonds between components may be formed by any type of reactions, as known to those of ordinary skill in the art, using the appropriate functional groups to undergo such reactions. Chemical interactions suitable for use with various embodiments described herein can be selected readily by those of ordinary skill in the art, based upon the description herein.

In some embodiments, an association between the analyte and the detector species may occur via a biological binding event (i.e., between complementary pairs of biological molecules). For example, the analyte or the detector species may include an entity such as biotin that specifically binds to a complementary entity, such as avidin or streptavidin, on another species or agent. Other examples of biological molecules that may form biological bonds between pairs of biological molecules include, but are not limited to, proteins, nucleic acids, glycoproteins, carbohydrates, hormones, and the like. Non-limiting examples include, but are not limited to, an antibody/peptide pair, an antibody/antigen pair, an enzyme/substrate pair, an enzyme/inhibitor pair, an enzyme/cofactor pair, a protein/substrate pair, a nucleic acid/nucleic acid pair, a protein/nucleic acid pair, a peptide/peptide pair, a protein/protein pair, a small molecule/protein pair, a receptor/hormone pair, a receptor/effector pair, a ligand/cellular receptor pair, a biotin/avidin pair, a biotin/streptavidin pair, a drug/target pair, small molecule/peptide pair, a small molecule/protein pair, and a small molecule/enzyme pair. Biological interactions between species and/or agent(s) for use in the embodiments described herein can be selected readily, by those of ordinary skill in the art, based upon the description herein as their function, examples of such biological interactions, and knowledge herein and in the art as to simple techniques for identifying suitable biological interactions.

In certain embodiments, the analyte and the detector species may be associated with each other via a physical interaction. For example, in some embodiments, analyte (e.g., supramolecular structure) may be physically entangled with at least a portion of the detector species (e.g., macromolecule).

In certain embodiments, the analyte and the detector species may be associated with each other via a linking moiety (e.g., other biological or chemical species that causes the analyte and the detector species to be in close proximity. For example, the shortest distance between the analyte and the detector species associated with each other may be greater than a Debye length. In some instances, the shortest distance may be less than or equal to about 100 nanometers, less than or equal to about 50 nanometers, less than or equal to about 25 nanometers, less than or equal to about 10 nanometers, or less than or equal to about 1 nanometers. In general, the analyte and the detector species may be directly associated with each other or indirectly associated with each other.

In some embodiments, the device for sensing a chemical and/or biological analyte comprises a source of a second alternating electric field. The source of the second alternating electric field can be configured such that the second alternating electric field produced by the source is incident upon the nanosensor. In some embodiments, the second alternating electronic field may have a different frequency and/or incident power than the first electric field. In some embodiments, the system may be excited with an electromagnetic field of one frequency and detected with a different electromagnetic field with a second frequency. This approach may provide an alternative method to study the system response by monitoring two different spectral regions.

According to certain embodiments, the second alternating electric field has a frequency that is different from the frequency of the first alternating electric field by at least about 10%, by at least about 25%, or by at least about 50% (and/or, in some embodiments by up to 100%, or more) of the frequency of the first alternating electric field. In certain embodiments, the two alternating electric field technique approach involves exciting the system with a first alternating electric field wave (e.g., a continuous wave) into a non-equilibrium state, and then measuring the induced changes in the system properties with a second alternating electric field wave (e.g., less intense or powerful wave). The changes in the system property, such as dielectric constant or other parameters directly related to Debye length, can be studied in the time domain with the two alternating electric field waves. In some embodiments, the time delay between the arrival of the first alternating electric field wave and system responses can provide quantitative information about the relaxation of the system.

In certain embodiments, the second alternating electric field has an incident power, at the nanosensor that is different from the incident power, at the nanosensor, of the first alternating electric field by at least about 50%, at least about 100%, or at least about 200% (and/or, in some embodiments, up to about 500%, or more) of the incident power of the first alternating electric field, at the nanosensor.

Methods of sensing a chemical and/or biological analyte (e.g., using any of the nanosensors described herein) are also provided. The methods described herein can be performed using any of the nanosensor configurations described herein.

In some embodiments, the method of sensing a chemical and/or biological analyte comprises applying an alternating electric field to the nanosensor. The alternating electric field that is applied to the nanosensor can have any of the properties (e.g., frequency, incident power at the nanosensor, etc.) described elsewhere herein.

In certain embodiments, the method of sensing a chemical and/or biological analyte comprises applying a second alternating electric field to the nanosensor. The second alternating electric field can have any of the properties of the second electric fields described elsewhere herein.

In some embodiments, applying an alternating electric field is applied to the nanosensor such that the Debye length of an analyte associated with the chemical and/or biological detector species associated with the nanosensor is altered (e.g., increased and/or decreased). In certain embodiments, application of the alternating electric field to the nanosensor results in a change in Debye length of at least about 1%, at least about 5%, or at least about 25% (and/or, in certain embodiments, up to 100%, or more), relative to the Debye length prior to the application of the alternating electric field.

In certain embodiments, a bias is applied across the Debye layer to further modify the Debye length. The bias can be, according to certain embodiments, configured to change the capacitance of the Debye layer. Without wishing to be bound by any particular theory, it is believed that the electric double layer is similar to a capacitor, though the positive ions and negative ions are suspended in a solution. A voltage bias can be applied across this double layer to change the capacitance and hence rearrange the electric double layer. This can be done, for example, by applying a voltage across the double layer using an electrode immersed in the solution and a microfabricated electrode on the substrate. It should be understood that other configurations that can be used.

In some embodiments, data can be collected from the nanosensor while the alternating electric field is applied to the nanosensor. In some such embodiments, data can be collected (e.g., continuously collected) while the applied alternating electric field is used to alter the Debye length of the target analyte.

In some embodiments, an electrical potential can be applied across the nanosensor while an alternating electric field is applied to the nanosensor (e.g., by) while the nanosensor is in the presence of a sample comprising an analyte. For example, in some embodiments, a voltage can be applied to one end of a nanochannel nanosensor. In some embodiments, while the voltage is applied, an alternating electric field can be directed toward an external surface of the nanosensor. In some embodiments, these steps can be performed while the nanosensor is in the presence of a sample comprising an analyte.

Some embodiments involve collecting a first set of data, based on the electrical potential applied to the nanosensor, at points in time at which the alternating electric field is at a first power to provide a background signal and collecting a second set of data, based on the electrical potential applied to the nanosensor, at points in time at which the alternating electric field is at a second power that is different from the first power to provide a signal indicative of a property of the analyte, the detector species, and/or an interaction between the analyte and the detector species. The data collection can be performed, for example, by analyzing a property (e.g., a voltage output) of the potential applied across the nanosensor.

Figure 6:
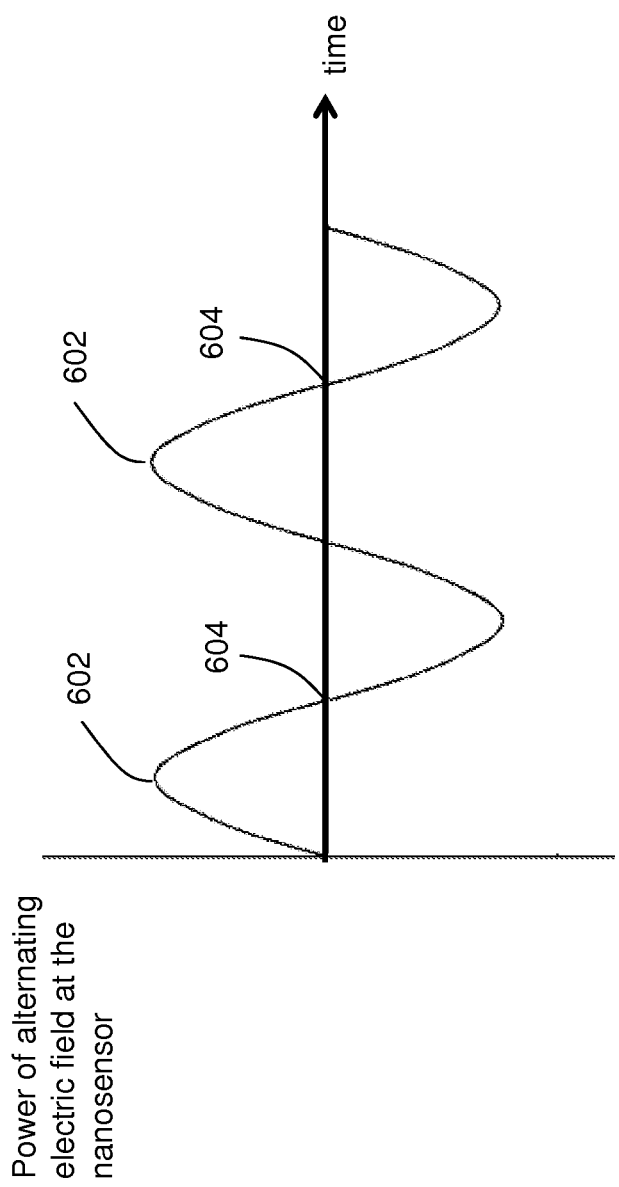
FIG. 6 is an exemplary plot of the power of the applied alternating electric field at a nanosensor as a function of time.

FIG. 6 is an exemplary plot of the power of the applied alternating electric field at a nanosensor as a function of time, which can be used to explain certain of the inventive data collection methods. Generally, the "power" of the applied alternating electric field is used to describe the level of the field at a given point in time. A particular applied alternating electric field can be said to have a maximum power (e.g., corresponding to the peaks illustrated in FIG. 6). Generally, the alternating electric field will oscillate between states in which it has a first maximum power at a first polarity and a second maximum power at a second polarity. According to some embodiments, data can be collected using the nanosensor as the power of the alternating electric field at the nanosensor is varied, for example, from a maximum (e.g., at points 602 in FIG. 6) to a minimum (e.g., at points 604 in FIG. 6). As noted above, some embodiments comprise collecting a first set of data at points in time at which the alternating electric field is at a first power to provide a background signal. Referring to FIG. 6, these data points can be collected at points in time 604, at which the applied alternating electric field is at a minimum. Certain embodiments also comprise collecting a second set of data at points in time at which the alternating electric field is at a second power that is different from the first power to provide a signal indicative of a property of the analyte, the detector species, and/or an interaction between the analyte and the detector species. Referring to FIG. 6, these data points can be collected at points in time 602, at which the applied alternating electric field is at a maximum.

Without wishing to be bound by any particular theory, it is believed that, when the applied alternating electric field is at a minimum, accumulation of ions near the nanosensor can "shield" the nanosensor from the target analyte, and thus, the data signal produced by the nanosensor is altered substantially only by background noise. It is also believed that, when the applied alternating electric field is at a maximum, ions accumulated near the nanosensor can be scattered, and thus, the nanosensor can be used to measure an interaction between the target analyte and the detector species. Is it also believed that the analyte bound, directly or indirectly, to the nanosensor surface can be completely shielded or unshielded. If the protein is completely shielded by the application of an external electromagnetic field or by any other means such as increasing the ionic concentration, then the sensor can measure the background signal, arising due species or factors not associated with the target analyte (i.e., unwanted noise sources). Non-limiting examples of unwanted noise sources include, but are not limited to, motion of the ions and other unwanted species near the sensor surface due to fluid dynamics, physical absorption of unwanted species on the sensor surface, thermal fluctuation of the charged species near the sensor surface, mechanisms that contribute to the change in the local dielectric constant near the sensor surface, and combinations thereof. In some embodiments, a method of extracting the background signal may involve measurement of nanosensor conductance when any bound analyte or protein on the sensor surface is intentionally shielded by the application of an alternating electromagnetic field. In some embodiments, when the analyte is unshielded, the corresponding nanosensor signal will contain the signal arising from the binding of the analyte and background arising from the noise sources, as discussed above. In some embodiments, the measurements of the completely shielded analyte and the unshielded analyte two sets of measurements can be used to better extract the signal and the background contributions.

In this way, one can simultaneously collect a first set of data to provide a background signal and a second set of data to provide a signal indicative of a property of the analyte, the detector species, and/or an interaction between the analyte and the detector species. This can be achieved, for example, by applying a single electrical potential across the nanosensor while exposing the nanosensor to an external alternating electric field. That is to say, some embodiments comprise, collecting, over a first period of time, a first set of data to provide a background signal and collecting, over a second period of time that overlaps with the first period of time (an, in some embodiments, overlaps with at least about 75%, at least about 90%, or at least about 99% of the first period of time), a second set of data to provide a signal indicative of a property of the analyte, the detector species, and/or an interaction between the analyte and the detector species. In certain embodiments, the first and second sets of data can be collected by analyzing the output of a single potential applied across a nanosensor or an array of nanosensors. This can be achieved, for example, by analyzing the output from a single applied voltage and isolating data containing information about the background signal from data containing information about a measured property (e.g., a property of the analyte, the detector species, and/or an interaction between the analyte and the detector species). Referring to FIG. 6, for example, this can involve, according to certain embodiments, isolating data collected at points in time 602 from data collected at points in time 604. In one embodiment, a conductance measurement of the nano sensor can be performed at the same frequency as the applied electromagnetic wave. In this method, a measurement of conductance can be taken when the electromagnetic wave magnitude is maximum, such that the effect of the electromagnetic wave is maximum. This is called in-phase measurement. A second measurement of conductance can be taken when the amplitude of the electromagnetic wave is zero, hence the electromagnetic field has no effect at that precise time. This is called quadrature (i.e., 90 degrees) measurement. Additionally, an out-of-phase measurement can be done when the magnitude of the electric field is minimum (negative of the in-phase magnitude). Using these three measurements, a data set can be constructed from which an accurate signal and a background can be extracted. In certain cases, the relative phases between these measurements can be tuned to obtain an optimal data set.

In some embodiments, the points in time at which the second set of data points are collected are phase-shifted from the points in time at which the first set of data points are collected. For example, according to some embodiments, the points in time at which the second set of data points are collected are phase-shifted from the points in time at which the first set of data points are collected by from about 75° to about 105°, by from about 85° to about 95°, or by from about 88° to about 92°. Those of ordinary skill in the art would recognize that a 360° shift in phase between two signals corresponds to a full wavelength shift. Referring to FIG. 6, for example, points 604 are shifted in phase from points 602 by 90°.

In some embodiments, collecting the first set of data at points in time at which the alternating electric field is at the first power to provide the background signal comprises collecting the first set of data at points in time at which the alternating electric field has a power of less than about 10%, less than about 5%, or less than about 1% of its maximum power. In some embodiments, collecting the first set of data at points in time at which the alternating electric field is at the first power to provide the background signal comprises collecting the first set of data at points in time at which the alternating electric field has a power of zero. Referring to FIG. 6, for example, a first set of data points can be collected at points in time 604, at which the power of the alternating electric field is about 0.

In some embodiments, collecting the second set of data at points in time at which the alternating electric field is at the second power comprises collecting the second set of data at points in time at which the alternating electric field has a power that is within about 10%, within about 5%, or within about 1% of its maximum power. Referring to FIG. 6, for example, a second set of data points can be collected at points in time 602, at which the power of the alternating electric field is at its maximum.

Figure 3:
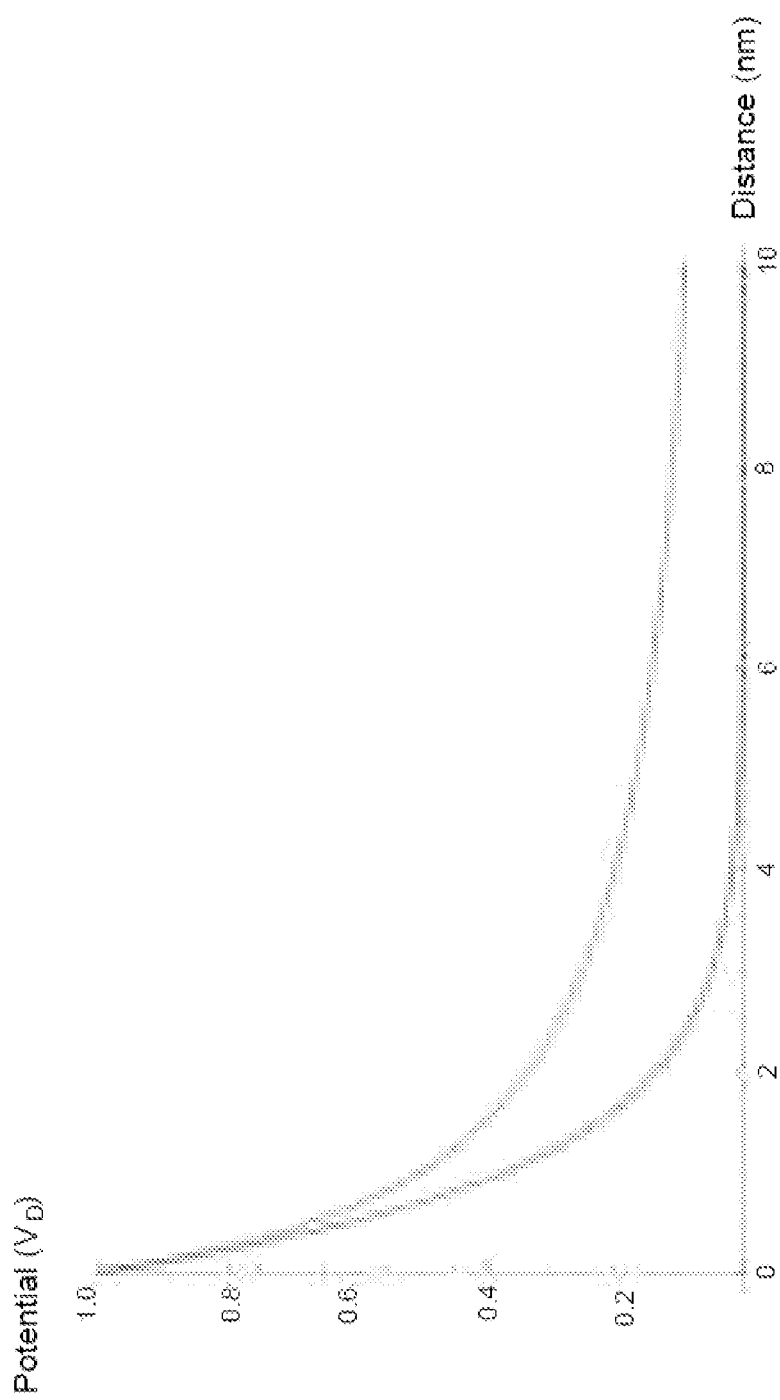
FIG. 3 is a plot of electric potential from a line of screened charge (lower curve, $V=V_0 \exp(r/\lambda)$ and a line of unscreened dipoles (upper curve, $V=V_0 (\lambda)/(r+\lambda)$), where $\lambda=1$ nm is the Debye length.

In one embodiment, a high frequency field can be applied to the nanosensor from additional electrical pads fabricated next to the sensors. By feeding a high frequency signal into the FET sensor, the Debye length can be controlled. The presence of high frequency oscillations in an electrolyte or aqueous solution can modify the DC Debye length into a characteristic frequency-dependent length. The characteristic frequency-dependent length can be interpreted as a generalized Debye length, calculated as:

$$\lambda(\omega) = \frac{\lambda_{dc}}{\sqrt{1 + i\frac{\lambda_{dc}^2 \omega}{D}}}$$

where $\omega$ is the angular frequency of the electric field modulation, $\lambda_{dc}$ is the Debye screening length defined above, and D is the diffusivity of the ions in the electrolyte. This length can be interpreted as characteristic of the extent of the charge distribution in the solution around the biomolecule. According to certain embodiments, at low frequencies, the electric double layer attenuates and phase shifts the input signal at the analyte, so that the analyte cannot "feel" the incoming signal. At high enough frequencies (e.g., greater than 1 MHz, in some cases), the ions in solutions cannot overcome the drag force of the water and no longer keep up with the input signal. With the electric double layer weakened, the analyte's oscillating dipole moment can develop an unscreened component. In some such cases, the nanosensor is no longer being gated by the analyte's screened charge (which generally falls off exponentially with distance), but instead by a line of flipping dipoles, whose potential falls off just as the inverse of distance (see, e.g., FIG. 3). Moreover, in some cases, as the attenuation due to the electrical double layer is reduced, a smooth transition between these two regimes can be achieved. Hence, according to some embodiments, the effective screening length may be electronically tuned via the signal frequency. Generally, the optimal frequency will depend on the concentrations and molecule sizes used.

In general, the ionic concentration of the solution determines the Debye length. Therefore, the ionic concentration or salt concentration of the solution is often modified for detecting lower analyte concentration. Usually, the lowering of the salt or ionic concentration of the solution results in the detection of lower analyte concentration and hence higher sensitivity. In one embodiment, the interplay between the lowering of the ionic or salt concentration and the modification of the corresponding Debye length by the application of a microwave signal can be used to obtain optimized conditions for higher sensitivity.

In one embodiment, an alternating electric signal is applied to electrical pads across the nanosensor. These electrical pads can be placed in such a way that the paths of resulting electrical field lines can be designed to be at the appropriate distance from the sensor surface. In certain embodiments, the pads can be fabricated on the same substrate surface as the nanosensor. Such sensor can be, according to certain embodiments, in the same plane as the sensors.

In one embodiment, the alternating electric signal is applied between a metallized bottom surface of the substrate and a pad fabricated on the top surface of the substrate containing the sensor. In general, both location and clustering of electrical field lines can be designed by appropriate design of the electrical pads used for the application of microwave.

In some embodiments, an alternating electric field with a single frequency is applied. In certain embodiments, an alternating electric field with components containing two separate frequencies may be used. Depending on the desired effect, the component with a lower frequency (or, the slow field), can be used to modify the slow processes such as the drag force, whereas the component with a higher frequency (or, the fast field) can be used to modify the Debye length.

The electric double layer described above can be considered to be a capacitor, where the positively charged ions and negatively charged ions are separated by a physical distance. Since the capacitance can be modified by applying a voltage bias across this electric double layer Debye capacitor, the corresponding Debye length can be changed by the bias. In one embodiment, a voltage bias can be applied between a pad and an electrode immersed in the solution to control, modulate or manipulate the Debye length.

As noted above, certain embodiments involve the detection of species using nanosensors. In some embodiments, the nanosensor correspond to a nanochannel, which can be constructed, in certain embodiments, from a semiconductor material. In some embodiments, the nanosensor is connected, at opposing ends, to electrodes. In certain embodiments, the nanosensor is treated (e.g., functionalized) with a detection species, which associates with (e.g., functionalizes) surfaces of the nanosensor such that the surfaces associated with the detector species are configured to interact with at least one analyte. In some such embodiments, the nanosensor has at least one electrical property that varies based, at least in part, on an interaction between a detector species associated with the nanosensor surface and at least one analyte (also referred to as "agent") contained in a sample (also referred to as an "analyte solution") introduced to the sensor. In certain embodiments, the sensing device includes a controller to control sensitivity of the nanosensor to the presence of the at least one analyte. In some embodiments, the controller configured to control the sensitivity of the nanosensor is configured to cause voltage to be applied to the nanosensor to cause conductance of the nanosensor to change (optionally, in a controlled manner). In some embodiments, the sensor comprises a gate structure of a field effect transistor (FET), and the electrodes connected to the nanosensor can correspond to the source and drain of the FET.

The nanosensors described herein can be configured to detect any suitable type of analyte. For example, in some embodiments, the nanosensor is configured to detect a protein, a nucleic acid, a monosaccharide, and/or a polysaccharide.

The nanosensors described herein can be biosensors, in some embodiments. The nanosensor can be configured to detect an analyte, which can be a chemical or biological species. In some embodiments, the nanosensor comprises an outer surface that is functionalized with a detector species. In certain embodiments, the detector species can chemically interact (directly, or indirectly) with the analyte of interest. In some embodiments, the interaction between the detector species and the analyte of interest creates a corresponding change in surface potential. In some embodiments, the nanosensor has a sufficiently small cross section to exhibit a shift of an electrical characteristic (e.g., a differential conductance characteristic). The shift of the electrical characteristic can be a shift into a negative bias operating region. The amount of the shift can be dependent on the surface potential or the surface charge. Functionalization of nanosensors can be performed according to standard protocols. For example, in certain embodiments in which urea is being sensed, the nanosensor(s) can be functionalized with urease. In certain embodiments in which glucose is being sensed, the nanosensor(s) can be functionalized with glucose oxidase. In some embodiments in which antigens are being sensed, the nanosensor(s) can be functionalized with one or more antibodies.

In some embodiments, the nanosensor is made of a semiconductor material. Suitable semiconductor materials from which a nanosensor can be made include, but are not limited to, silicon, germanium, III-V semiconductors, and the like. In some embodiments, the nanosensor is made of silicon.

The nanosensor may be, in some embodiments, a field-effect transistor nanosensor. Generally, field effect transistors (FETs) use an electric field to control the electrical channel of conduction, and hence the conductivity of the charge carriers in the channel. The flow of charge carriers between the source and the drain can be tuned by modifying the size and the shape of the conducting channel by applying an electric field to the gate. In an exemplary biosensor configuration, the FET comprises a nanosensor (e.g., nanowire) channel between source and drain terminals. The nanosensor (e.g., nanowire) surface can be bio-functionalized so that a biomolecular binding event can create an electric field, similar to the control electric field applied to a conventional FET (FIG. 1). In certain devices that use the FET principle, a designated, physically separated sensor surface can be formed by precision manufacturing. The FET sensor can be connected to an electronic circuit to monitor the specific conductance of the sensor surface. In some embodiments, operationally, many independent electronic circuits may be interrogated in a massively parallel manner. FET biosensors can be adapted for the measurement of biomolecules interacting with such a sensor surface (FIG. 1). The surface of a FET biosensor can be modified to selectively recognize one or more specific analytes. In some embodiments, species (e.g., antibodies) can be conjugated to the nanosensor surface as part of the manufacturing process. These species (e.g., antibodies) can be selected for specific detection of an analyte (e.g., a protein) of interest. Molecular binding events between the analyte and the species (e.g., antibodies) on the biosensor surface can cause changes to the biosensor surface charge density and/or surface potential. In this manner, precision manufacturing of FET biosensors can allow for sensitive analyte recognition. The differential conductance amplitude can be correlated to the analyte concentration in the sample solution.

In some embodiments, lithographic methods are used to fabricate gates at the bottom, the top, and/or the side of the nanosensors.

In some embodiments, the nanosensor can be part of a bias and measurement circuit. In some embodiments, the bias and measurement circuit is operated by applying a bias voltage across two ends of the nanosensor (e.g., nanochannels) within the circuit. The bias voltage can be selected to be sufficiently negative to achieve a desired dependence of the differential conductance of the sensing element on the surface potential of the nanochannels. In certain embodiments, this dependence has a steeply sloped region of high amplification which is substantially greater than a reference amplification exhibited by the sensing element at a zero-bias condition, thus achieving relatively high signal-to-noise ratio. The bias and measurement circuit measures, in some embodiments, the differential conductance of the sensing element and converts the measured differential conductance into a signal indicative of presence or activity of the analyte. In certain embodiments, the measured differential conductance can be converted into a signal indicative of the presence or activity of the analyte by using a look-up table or alternative conversion mechanism reflecting a prior calibration operation. In some embodiments, applied gate voltage can be used to control a sensor's sensitivity. The bias and reference gate voltage can be used independently, according to certain embodiments, to control sensitivity.

In some embodiments, the nanosensor comprises a nanoscale silicon-based FET device. Many such devices show sensitivity, reliability, robustness and the sensor flexibility needed for many multiplexed diagnostics microarrays. In some cases, the nanoscale devices can be developed and/or implemented on traditional top-down silicon. In some case, by developing and implementing the nanoscale devices on traditional top-down silicon, the reliability and robust quality of top-down silicon semiconductor manufacturing processes can be improved and error rates in testing, both in point-of-care and central reference labs can be reduced. This can result in increased effectiveness of each patient visit to a lab or clinic, reduced cost of diagnosis, and earlier diagnosis, treatment, and monitoring.

In one particular embodiments, the nanosensor is a silicon nanochannel field effect transistor (FET) biosensor. Such sensors can be used to perform highly sensitive and/or label-free analyte detection. Such sensors can have exceptional electrical properties and small dimensions. In certain embodiments, the silicon nanochannels are ideally suited for extraordinarily high sensitivity. In some cases, the high surface-to-volume ratios of these systems make single molecule detection possible. In some cases, such FET biosensors offer the benefits of high speed, low cost, and high yield manufacturing, without sacrificing the sensitivity typical for traditional optical methods in diagnostics. Top down manufacturing methods can be used to leverage advantages in Complementary Metal Oxide Semiconductor (CMOS) technologies, allowing for richly multiplexed sensor arrays. Examples of nanochannel based sensor systems are described, for example, in International Patent Publication WO 2008/063901A1 by Yu Chen et al., and International Patent Publication WO 2009/124111A1 to Mohanty et al., each of which is incorporated by reference in its entirety for all purposes.

In one set of embodiments, the FET biosensors are adapted for the measurement of biomolecules interacting with such a sensor surface. The surface of the FET biosensor can be modified to selectively recognize specific analytes. For example, antibodies can be conjugated to the surface, for example, as part of the manufacturing process. These antibodies can be selected, for example, for specific detection of a protein of interest. Molecular binding events between the analyte and the antibodies on the biosensor surface can cause changes to the biosensor surface charge density and/or surface potential. In this manner, precision manufacturing of FET biosensors can allow for sensitive analyte recognition. The differential conductance amplitude can be correlated to the analyte concentration in the sample solution.

In some embodiments, silicon nanostructures (e.g., nanochannels) can be used to fabricate a field effect transistor (FET). In conventional FETs, lithographic methods are used to fabricate gates at the bottom, the top, and/or the side. In some embodiments, the nanochannels' surfaces can be functionalized with specific receptor or antibody to interact with agents/species of interest. In a fluid, the ligand (or antigen) can bind to the receptor, which results in a change in the surface charge profile and the surface potential. Essentially, this binding behaves as a field effect. The conductance and the I-V characteristics of the nanochannel can therefore be used to characterize biomolecular binding—for instance, to determine concentration and binding dissociation constant. In some embodiments, characteristics of differential conductance dI/dV can be used for even higher sensitivity in the field effect due to biomolecular binding. In particular, dI/dV characteristics allow measurement at low bias, essential for avoiding electrolysis.

The nanosensors described herein can be useful in a wide variety of fields. For example, the nanosensors may be used for analyte detection for medical diagnostics, public health, epidemiologic studies, personalized medicine, monitoring/surveillance, agriculture, and in defense industries.

According to an aspect of the present application, an external electric field is applied to a charged particle in an ionic fluid to induce an electric dipole. The charged particle may be a charged biomolecule or other charged target particle desired to be detected, and in at least some embodiments is a charged nanoparticle. The ionic fluid may include charged species which effectively screens the charge of the charged particle from a detector, thus making detection of the charged target particle difficult. An electric field may be applied to the ionic fluid using a suitable electrode configuration to induce an electric dipole from the charged target particle and the ionic fluid, allowing detection of the presence of the charged target particle. In some embodiments, the applied electric field has a frequency selected to take advantage of an electroosmotic effect, facilitating creation of the dipole and therefore detection of the charged target particle.

Charge-based biosensors of analytes in ionic fluids can suffer from reduced sensitivity due to Debye screening of charges on the analyte. This problem can be overcome through inducing a dipole moment between the analyte and the ions in the Debye layer. Such a solution may be realized through use of electrodes to create an external field, which induces a dipole moment. The dipole moment creates its own field, which can be detected and provide information about the screened internal charge, allowing detection of the analyte. The induced dipole moment can have a complicated frequency dependence which may be exploited to further improve device sensitivity.

According to an embodiment, a method of separating charges in a fluid through application of an electric field is provided, in order to increase sensitivity of biosensors. Large biomolecules, such as proteins or virus fragments (which can be considered nanoparticles), may contain free charges on their surface or interior. In some embodiments, the particle is less than 10 nm in size. In other embodiments, the particle is between 10 and 100 nm. In certain embodiments, the particle can be greater than 100 nm in size. The charge properties are, in principle, beneficial for charge-based detection methods—detecting the presence of such a protein simply requires bringing it near a charge sensor and holding it in place long enough to measure.

Figure 7:
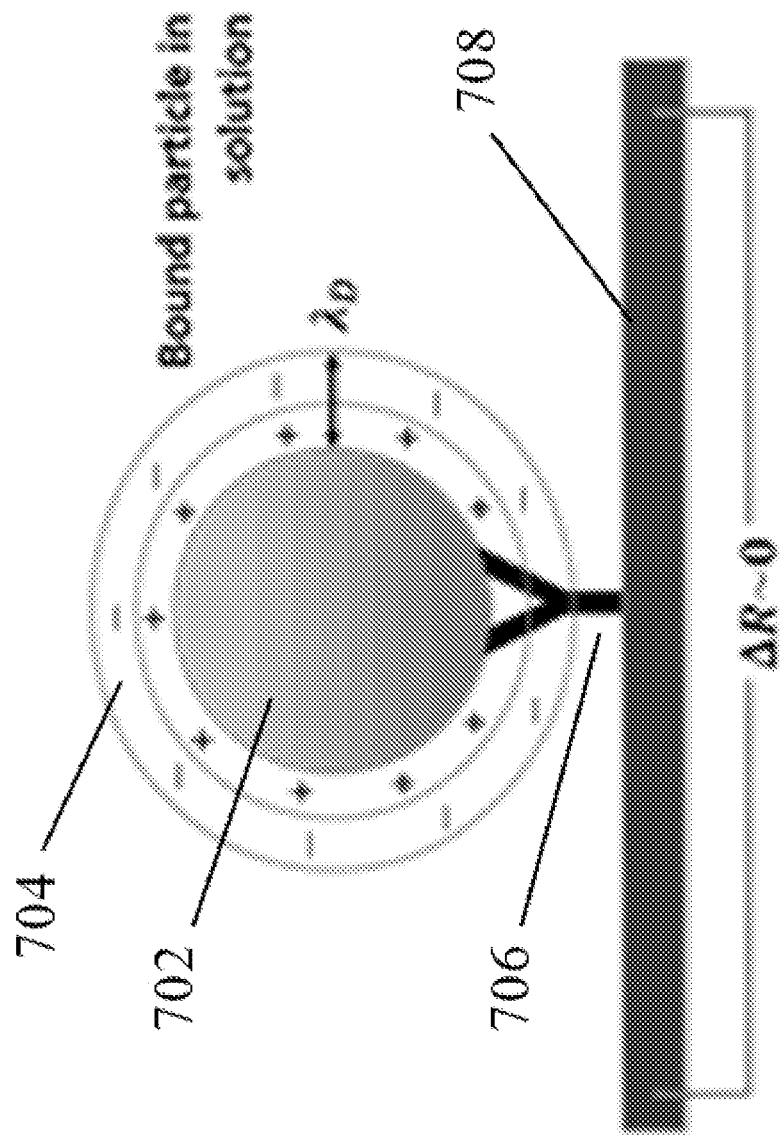
FIG. 7 illustrates a charged nanoparticle in an ionic fluid, with the charged nanoparticle screened by the ions, decreasing its electric field and leading to reduced sensitivity.

However, a charged nanoparticle in an ion-rich fluid, such as blood, will generally attract local opposite charges (generally smaller, mobile species such as Na, K, Cl, Ca and other ions), as illustrated in FIG. 7. That figure shows a charged nanoparticle 702 which happens to have a positive charge. A shell 704 of negative charge is, in an exemplary embodiment, formed around the charged nanoparticle 702 as a result of the presence of negatively charged ions in the ionic fluid. The charged nanoparticle 702 is shown bound to an antibody 706 (although other detectors may be used) on a sensor 708 (e.g., a nanowire). The net result of the charged nanoparticle 702 and shell 704 is an electrically neutral body consisting of a charged dielectric interior and an oppositely charged surface shell, as illustrated in FIG. 7. The charged shell thickness is given by the Debye length $\lambda_D$), which depends on the ionic valences z and concentrations n within the fluid, the fluid's dielectric constant $\epsilon$, and the temperature T, $$\lambda_D = \sqrt{\frac{\epsilon\epsilon_0 k_B T}{e^2 \Sigma_i n_i z_i^2}}.$$

Here, i refers to each distinct ionic species in the fluid. From far away the particle looks neutral, and therefore cannot be detected electrically. For instance, as shown in FIG. 7, the resistance ΔR across the sensor 708 is approximately zero. Very close to the particle, within one Debye length of the particle's surface, the particle can be detected by its electric field. Outside of the Debye length, the particle's charge is fully screened. The Debye length for a nanoparticle in a fluid such as blood is typically of order 1-10 nm. In some embodiments, the intrinsic charge on the nanoparticle is in its interior. In some embodiments, the charge is on the nanoparticle's surface. In some embodiments, the charge is evenly distributed. In certain embodiments, the charge is localized. Aspects of the present application allow for detection of the charged nanoparticle in all possible charge distribution possibilities for the nanoparticle.

Nanowire field-effect transistor (FET) biosensors, such as those described herein, as well as other possible sensors, rely on the charge of the protein or other biomolecule for detection. Antibodies, or other biomolecule-specific binding sites such as DNA (known hereafter as "detectors"), are attached to the surface of a semiconducting nanowire. In some embodiments, the nanowire is made from silicon, germanium, or a III-V semiconductor. In certain embodiments, the nanowire is a carbon nanotube. When the specific biomolecule, or "analyte," binds to the detector, it is held close to the nanowire for a long period of time. In some embodiments, the analyte is a protein. In certain embodiments, the analyte is a virus particle. The charge on the analyte creates an electric field, which gates the semiconductor nanowire and changes its conductivity. In some embodiments, a measured resistance (or conductance) change ΔR indicates the presence of the analyte. This is the same phenomenon used in a metal-oxide-semiconductor FET (MOSFET), where an external gate voltage is applied to turn the semiconductor from insulating to conducting. In certain embodiments, charge is detected through a change in the surface plasmon resonance. Some embodiments will use a different charge detection method. Aspects of the present application cover all such embodiments.

If the charged analyte is in solution, and is within one Debye length of the nanowire surface, its electric field can act to gate the nanowire. However, most detectors (such as antibodies) that are functionalized onto the nanowire are ~10 nm in length, of the same order as or greater than the Debye length, as shown in FIG. 7. In some embodiments, the Debye length is less than 1 nm. In some embodiments, the Debye length is 1-10 nm. In certain embodiments, the Debye length is greater than 10 nm. The sensitivity to the protein is then very limited, or binding may even be undetectable, as the analyte will appear to be electrically neutral and produce no electric field at the location of the nanowire sensor. Detection of the Debye-screened nanoparticles in ion-rich fluids may thus be facilitated by modifying the charge distribution properties of the nanoparticle/fluid such that the nanoparticles can be detected electrically.

Figure 8:
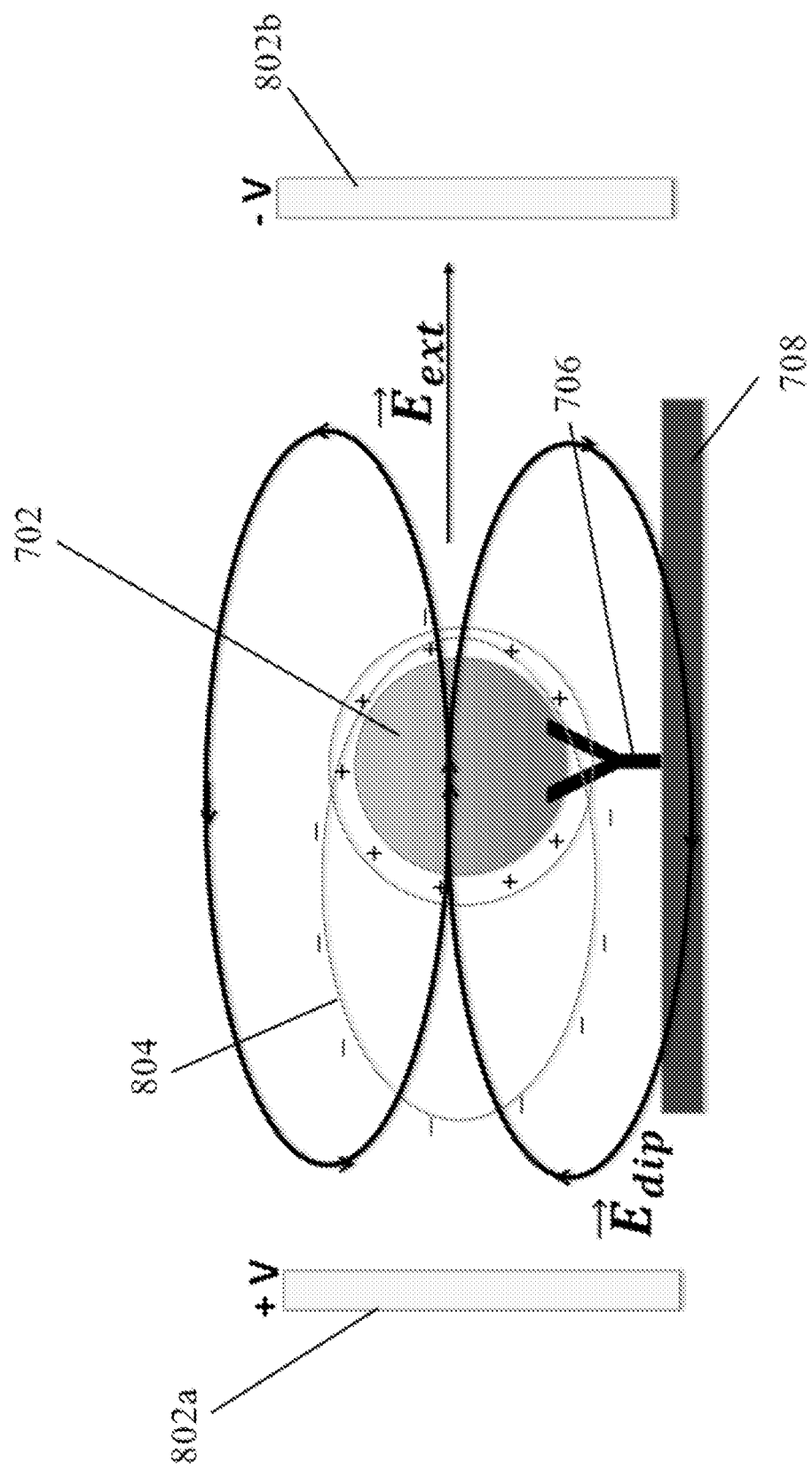
FIG. 8 illustrates a dipole field produced by polarization induced by an applied electric field. The Debye-screened particle becomes a dipole under application of an external field. The induced dipole creates an electric field, allowing for detection of the screened charge.

According to an aspect of the present application, a method of changing the charge distribution involves dipolar induction with an applied electric field. The mobility of a charged particle within a fluid depends on its mass and radius. Smaller, lighter particles (such as the elemental ions in blood) will have higher mobilities, and will move faster and farther than larger, heavier particles in response to an applied driving force such as an electric field. Applying an electric field to the Debye-screened nanoparticle will induce the smaller, lighter ions in the surface layer to move quickly, while the larger central particle will move much less and stay bound to the nanowire sensor. The ionic separation will induce a dipole moment near the nanoparticle, and the dipole will then create an electric field, illustrated in FIG. 8. In particular, FIG. 8 illustrates application of an external electric field $E_{ext}$ by electrodes 802a and 802b, which in the illustrated embodiment carry voltages V and −V, respectively. It can be seen that the result of application of the external electric field is that the negative charge shell 704 of FIG. 7 is displaced (or distorted) to create charge distribution 804 in FIG. 8. A dipole electric field $E_{dip}$ is therefore created. In some embodiments, this electric field will either act to gate the semiconductor nanowire and increase the measurement sensitivity, or will oppose (add to) the measurement voltage and result in a reduced (increased) current flow. The net result of both effects is a change in the measured effective resistance. This detected resistance change is dependent on the properties of the analyte, and therefore provides information about the screened charge. Thus, direct detection of nanoparticles otherwise undetectable due to Debye screening is allowed. All electric field detection techniques are covered by these aspects of the present application.

For a particle with low mobility within the fluid, the dipole coefficient which relates the polarization to the applied electric field is $$f = -\frac{1}{2} + \frac{1}{2\left(1 + \frac{i\lambda_D^2 \omega}{D}\right)}\left(\lambda_D\left(\frac{1}{2} + b\left(\frac{\lambda_D^2 \omega}{D}\right)\right) + \frac{4Pe\lambda_D^2}{3a^2}\right)\zeta^2.$$

In this formula, ω is the frequency of the applied electric field $E_{ext}$, a is the particle's radius, b~−⅙ and Pe are constants related to the ion concentrations and properties, D is the diffusion constant of the ions (a measure of how rapidly they can move within the fluid), and ζ is the particle's zeta potential, related to its mobility within a given fluid. In some embodiments, the parameters b and Pe depend on the frequency. The assumptions used to derive this particular embodiment are valid for a large particle with a small charge, similar to large protein or virus particle. In other embodiments, the zeta potential ζ will be less than 0.01. In certain embodiments, the zeta potential ζ is between 0.01 and 1. In some embodiments, the zeta potential ζ is greater than 1. The aspects described herein cover all possible functional forms. The electric field generated will be that of a dipole, illustrated in FIG. 8 as $E_{dip}$.

Figure 9:
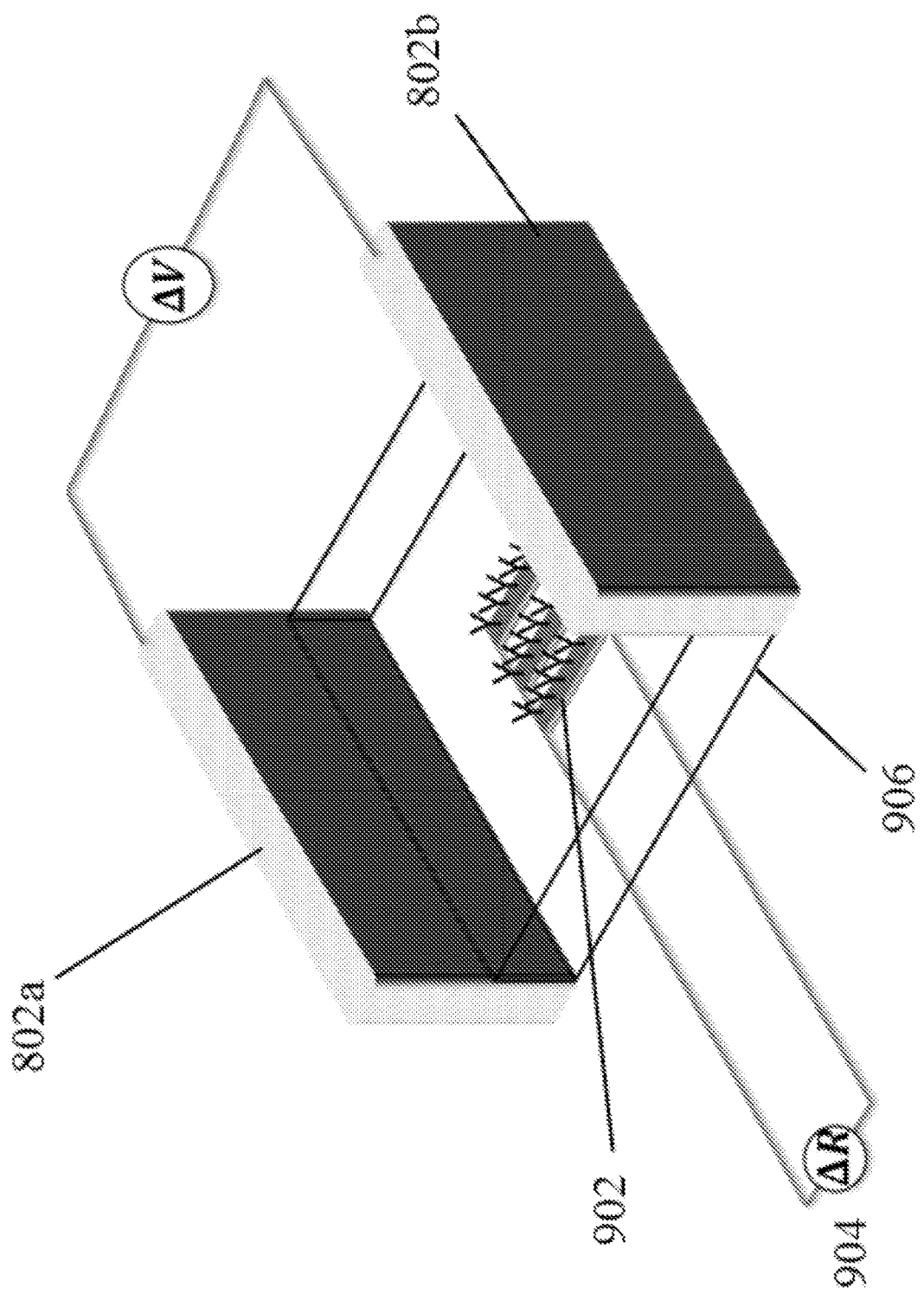
FIG. 9 illustrates a device for detecting nanoparticles in an ionic fluid and exhibiting a dipole electric field. The device includes a number of nanowires, between two electrodes. An applied voltage to the electrodes changes the resistance of the nanowire sensors.

FIG. 9 shows a schematic of one embodiment of a biosensing device which may utilize the detection of dipoles consistent with the foregoing description. A number of functionalized nanowires 902 are in the center, connected to a resistance-measuring device 904. Three nanowires 902 are illustrated, but any suitable number may be used. A channel 906 or other fluid-flow control mechanism surrounds the nanowires 902, into which the fluid is injected. The field-generating electrodes 802a and 802b are on each side of the sensor, subjected to a voltage differential ΔV. A change in resistance ΔR is measured in response to the voltage differential, which signals the presence of the analyte. Both low-frequency and high-frequency voltage and resistance can be applied and measured, although a combination of frequencies may be employed to increase sensitivity, as discussed below. Some embodiments will use antibodies as binding sites. Certain embodiments will use DNA to bind the nanoparticle. All embodiments according to this non-limiting aspect of the present application will detect the nanoparticle via its induced dipole electric field. Some embodiments place electrodes above and below the sensor. Certain embodiments employ more than two electrodes to create the electric field.

This form of the dipole coefficient leads to a complicated frequency dependence of the polarization. At a certain frequency, the "cross over frequency,"

$$\omega_c \sim \frac{2\sqrt{3Pe}\,|\zeta|D}{3a\lambda_D},$$

the polarization constant changes sign or goes to zero depending on the exact systematic parameters. Some embodiments will have a different cross-over frequency. The described aspects cover all possible values of the cross-over frequency. In practice, the cross-over frequency may be treated as a band (or range) rather than a single value, since some of the variables may be defined statistically. Thus, some embodiments described herein will use an applied electric field with a frequency below the cross-over frequency, and others with a frequency above the cross-over frequency. Certain embodiments will be used near the cross-over frequency. The band or range may, in some embodiments be defined by the cross-over frequency +/− 10% of the cross-over frequency, +/− 5%, or other suitable range to induce the desired dipole behavior in a particular sample being analyzed. Utilizing an applied electric field within this range of frequencies may allow for electroosmotic effects to be realized, facilitating creation of the desired dipoles and therefore facilitating detection of the target particle. Use of an electric field having a frequency too low or too high relative to this range will, in some embodiments, fail to induce the desired dipole behavior. Thus, it should be appreciated from the foregoing that in at least some embodiments the frequency of the applied electric field is based on the parameters listed above in the calculation of $\omega_c$.

AC excitation of the dipole moment can be advantageous from a sensitivity standpoint. Some embodiments will use lock-in techniques to detect analyte presence, which has the potential to greatly reduce noise. Some embodiments may also have a resonant frequency which provides maximum sensitivity, and such embodiments will be utilized near that frequency. In some embodiments, operating at high frequency will prevent the motion of the nanoparticle, decreasing the probability of unbinding due to motion. The present application is not limited to using any particular frequency of the applied electric field.

Biosensors of weakly charged particles in ionic fluids can suffer from lack of sensitivity due to Debye screening. As should be appreciated from the foregoing, aspects of the present application provide a sensor with electrodes to induce dipolar charge separation, representing a significant improvement over existing methods. The described methods covers all geometries, including detection by fields that change the gating or by fields that otherwise offer detection of Debye-screened nanoparticles. Also, the described embodiments pertaining to dipolar separation can also be used with charge detection methods other than functionalized nanowire FET.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of sensing a chemical and/or biological analyte, comprising:
    applying an alternating electric field across a first electrode and a second electrode, wherein a nanosensor is disposed between the first electrode and second electrode such that the alternating electric field is applied to the nanosensor, wherein the nanosensor is functionalized with a chemical and/or biological detector species in the presence of a sample comprising an analyte;
    applying an electrical potential across the nanosensor, comprising applying a voltage across a third electrode in electrical communication with a first portion of the nano sensor and a fourth electrode in electrical communication with a second portion of the nanosensor;
    collecting a first set of data, while applying the electrical potential and the alternating electric field, at points in time at which the alternating electric field is at a first power to provide a background signal; and
    collecting a second set of data, while applying the electrical potential and the alternating electric field, at points in time at which the alternating electric field is at a second power that is different from the first power to provide a signal indicative of a property of the analyte, the detector species, and/or an interaction between the analyte and the detector species.

2. The method of claim 1, wherein applying the alternating electric field comprises applying the alternating electric field with an incident power of at least about 1 picowatt at the nanosensor.

3. The method of claim 1, wherein applying the alternating electric field comprises applying the alternating electric field with a frequency of at least about 1 kHz.

4. The method of claim 1, wherein applying the alternating electric field comprises applying the alternating electric field with a frequency of at least about 1 MHz.

5. The method of claim 1, wherein applying the alternating electric field comprises applying the alternating electric field with a frequency of at least about 1 GHz.

6. The method of claim 1, wherein applying the alternating electric field comprises applying the alternating electric field with a frequency of between about 1 kHz and about 1 THz.

7. The method of claim 1, wherein the alternating electric field is configured to alter the Debye length of the analyte.

8. The method of claim 1, wherein the frequency of the alternating electric field produced by the source is selected, at least in part, based upon an ionic concentration of the sample.

9. The method of claim 1, wherein applying the electric potential comprises applying a second alternating electric field.

10. The method of claim 9, wherein the second alternating electric field has a second frequency that is different from a first frequency of the alternating electric field by at least about 10% of the first frequency of the alternating electric field.

11. The method of claim 9, wherein the second alternating electric field has a power across the nanosensor that is different from an incident power of the alternating electric field at the nanosensor by at least about 50% of the incident power of the alternating electric field nanosensor.

12. The method of claim 1, wherein the detector species comprises an antibody, enzyme, protein, peptide, small molecule, nucleic acid, aptamer, receptor molecule, polymer, and/or supramolecular structure.

13. The method of claim 1, wherein:
    the third electrode, fourth electrode, and nanosensor extend along a portion of a substrate; and
    the first electrode and second electrode are disposed on opposite sides of the portion of the substrate and are spaced from the nanosensor.

14. The method of claim 1, wherein collecting the first set of data at the points in time at which the alternating electric field is at the first power to provide the background signal comprises collecting the first set of data at a first plurality of points in time at which the alternating electric field is at the first power.

15. The method of claim 14, wherein the alternating electric field alternates between a minimum power and a maximum power, and the first power comprises the minimum power of the alternating electric field.

16. The method of claim 1, wherein collecting the second set of data at the points in time at which the alternating electric field is at the second power comprises collecting the second set of data at a second plurality of points in time at which the alternating electric field is at the second power.

17. The method of claim 16, wherein the alternating electric field alternates between a minimum power and a maximum power, and the second power comprises the maximum power of the alternating electric field.

* * * * *